Feb. 25, 1936.  J. R. L. DEGLARGE  2,032,267
WAGON FOR TRANSPORTATION BY RAIL AND BY ROAD
Filed Feb. 20, 1934  3 Sheets-Sheet 1
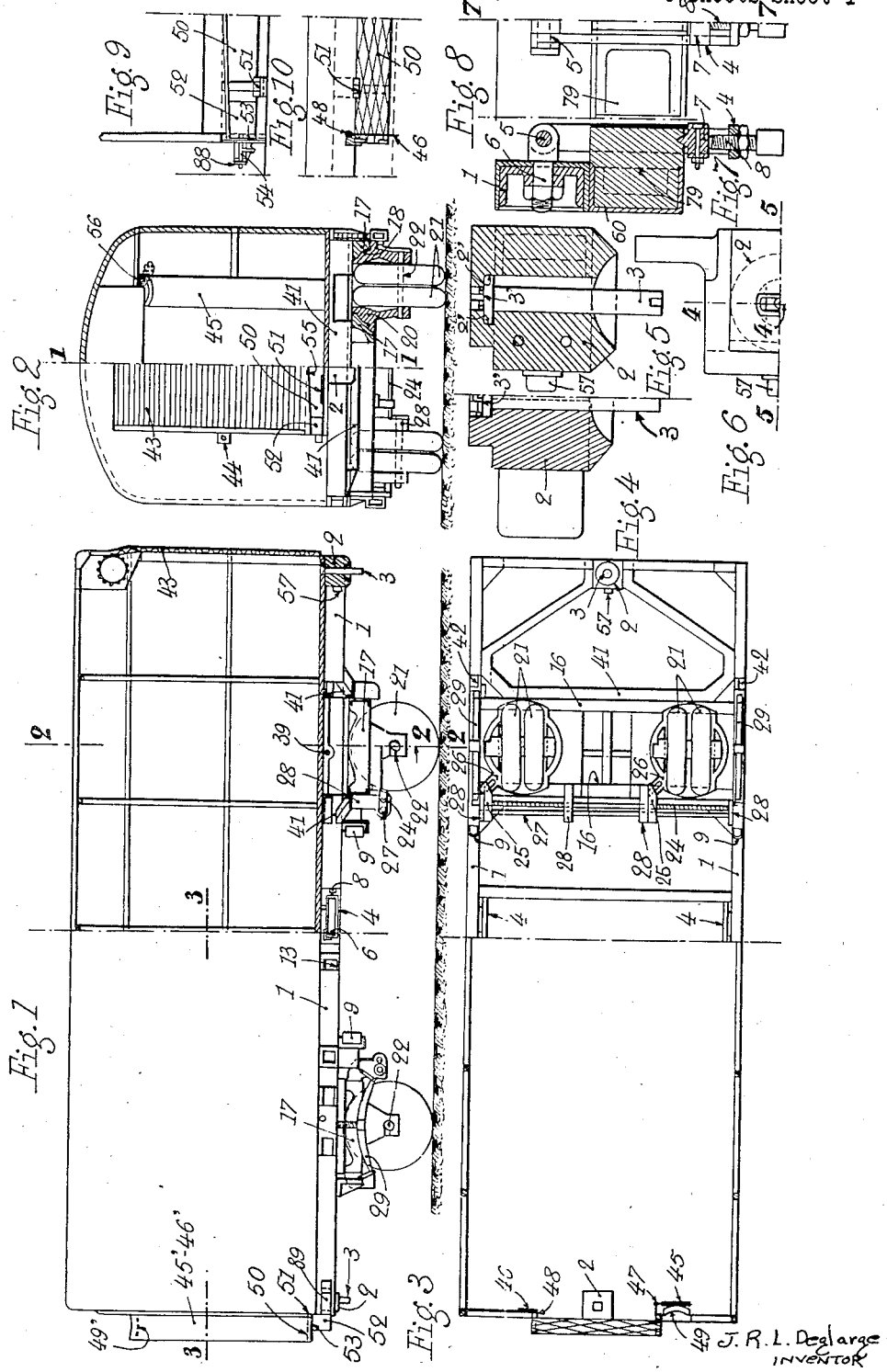
J. R. L. Deglarge
INVENTOR
By Marks & Clerk
Attys

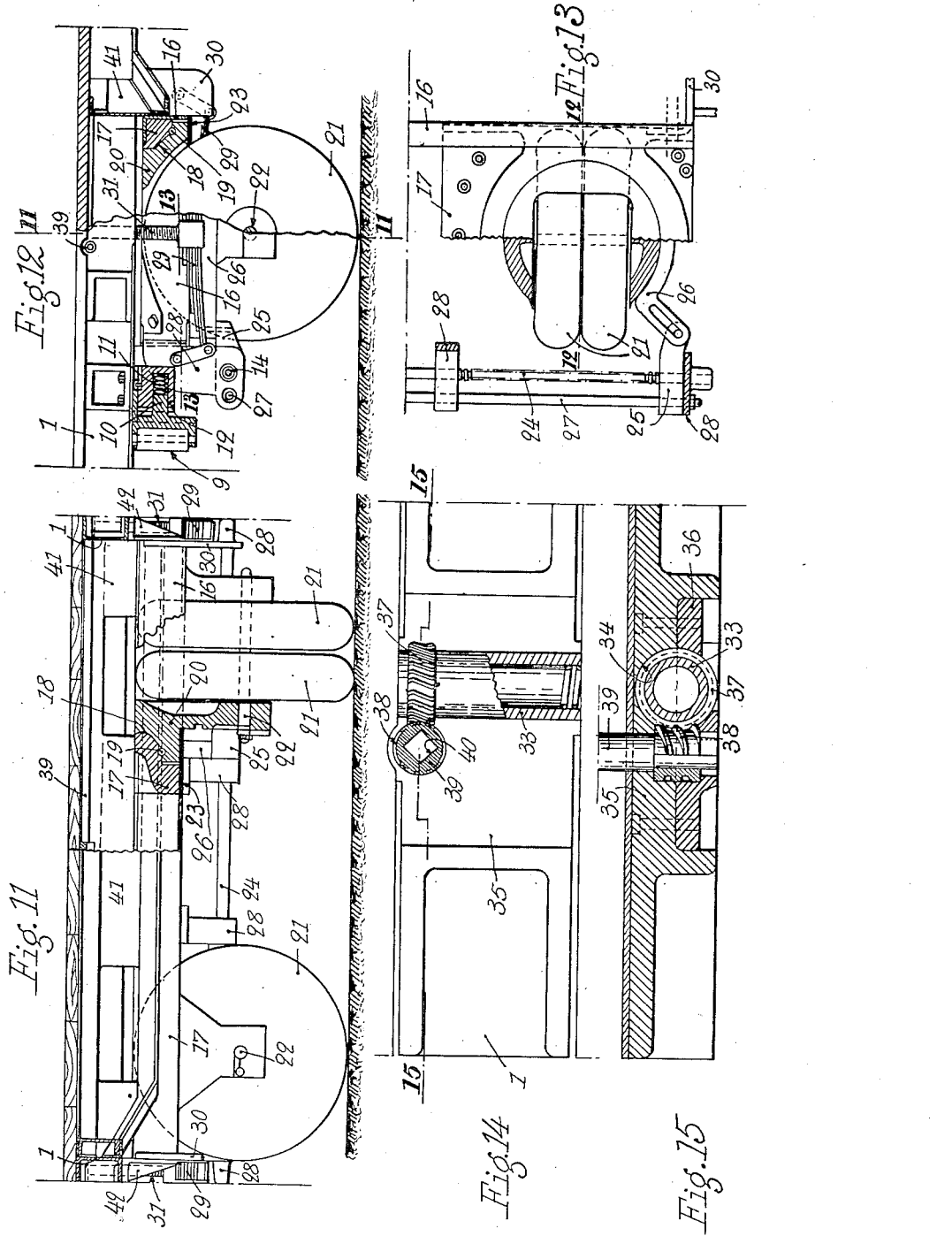

Feb. 25, 1936. J. R. L. DEGLARGE 2,032,267
WAGON FOR TRANSPORTATION BY RAIL AND BY ROAD
Filed Feb. 20, 1934 3 Sheets-Sheet 3
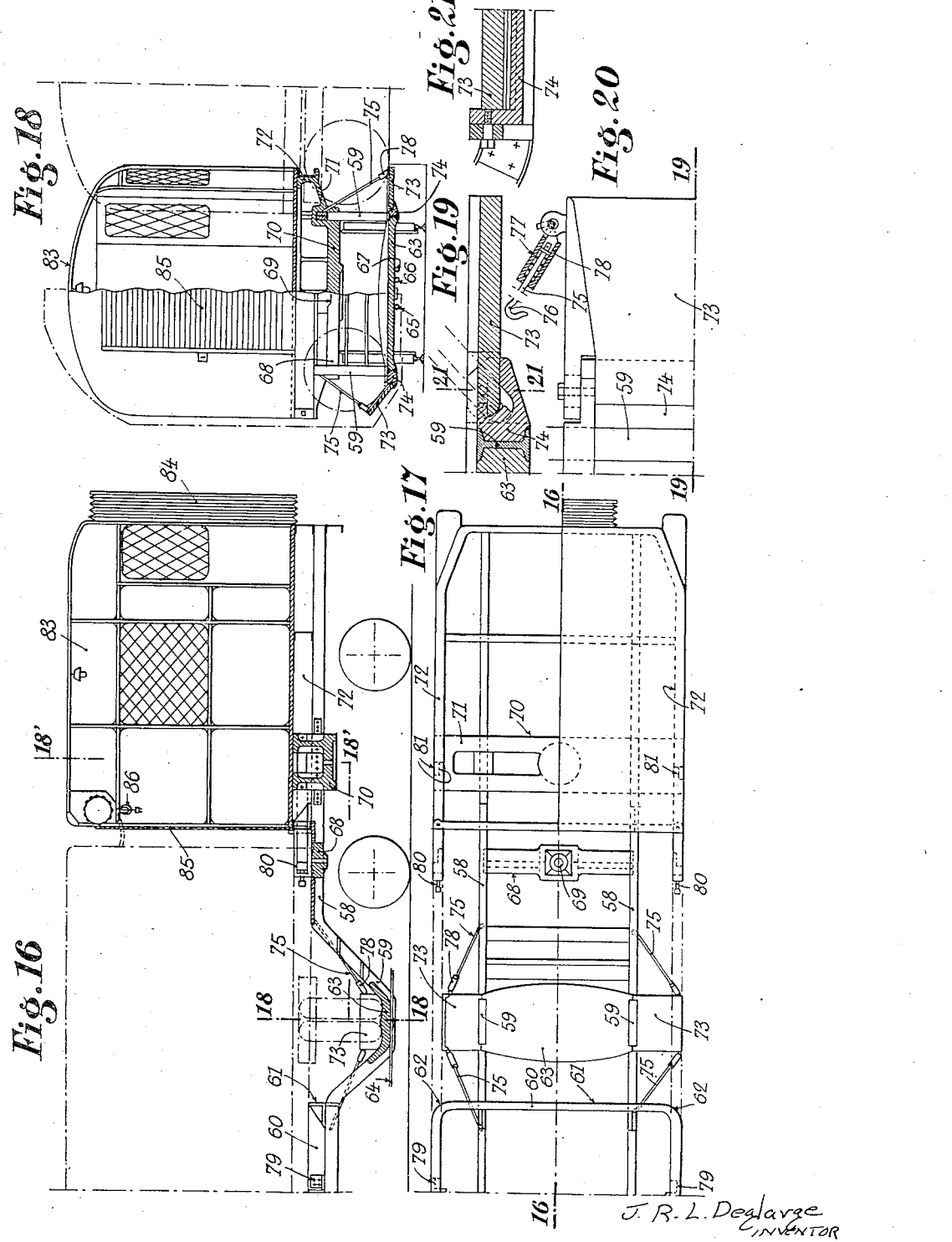

Patented Feb. 25, 1936

2,032,267

UNITED STATES PATENT OFFICE 2,032,267

WAGON FOR TRANSPORTATION BY RAIL AND BY ROAD

Julien René Louis Deglarge, Wattrelos, France

Application February 20, 1934, Serial No. 712,224
In France February 27, 1933

7 Claims. (Cl. 105—159)

The present invention has for its object a wagon adapted to circulate on rails and provided with a removable part adapted to be used as a trailer for transportation by road.

In the annexed drawings, given solely by way of example:

Fig. 1 is a half elevational and half sectional view on the line 1—1 of Fig. 2 of the removable part or trailer according to the invention.

Fig. 2 is a half end view and a half sectional view on the line 2—2 of Fig. 1 of said trailer.

Fig. 3 shows on the left side a half sectional view of said trailer on the line 3—3 of Fig. 1 when looking downwards and on the right side a half plan view of the same as viewed from the underside of said trailer.

Fig. 4 is a half vertical section on the line 4—4 of Fig. 6 of one of the jointed bearing elements of said trailer.

Fig. 5 is a vertical section of said jointed element on the line 5—5 of Fig. 6.

Fig. 6 is a plan view of said jointed element.

Fig. 7 is a section on the line 7—7 of Fig. 8 of one of the stretchers used for securing the trailer on the wagon.

Fig. 8 is a half front view of said stretcher.

Fig. 9 is a front view of the lower portion of the curtain of one end door of the trailer.

Fig. 10 is a corresponding plan view.

Fig. 11 is a half front view and a half sectional view on the line 11—11 of Fig. 12 of one set of wheels, the wheels on the left side being shown in the position corresponding to a transversal displacement of the trailer, and the wheels on the right side being shown in the position corresponding to a longitudinal displacement of the trailer.

Fig. 12 is in part an elevational side view of one of the set of wheels and in part a sectional view on the line 12—12 of Fig. 13.

Fig. 13 is a plan view of a half set of wheels, the left side of said figure being a section on the line 13—13 of Fig. 12.

Fig. 14 is an elevational view, with parts broken away, of one of the devices for lifting or lowering the sets of wheels of the trailer.

Fig. 15 is a horizontal section of said device on the line 15—15 of Fig. 14.

Fig. 16 is a vertical longitudinal section on the line 16—16 of Fig. 17 of half a wagon, the removable part or trailer being removed.

Fig. 17 is a corresponding plan view.

Fig. 18 is on the left side a half end view with partial section on the line 18—18 of Fig. 16 and on the right side a half sectional view on the line 18'—18' of the same Fig. 16.

Fig. 19 is a sectional view on the line 19—19 of Fig. 20 of one of the pivoted plates forming on the wagon the extensions of the roller path for the wheels of the trailer.

Fig. 20 is a corresponding half plan view.

Fig. 21 is a half sectional view on the line 21—21 of Fig. 19.

The trailer or removable part (Figs. 1 to 15) comprises a frame 1 which has any desirable length, but its width must not exceed the limit of loading of the standard clearance gauge required for railways. This frame 1 consists of an assemblage of iron pieces, rolled or stamped, and comprises at each end of its longitudinal axis a jointed load bearing element 2 (Figs. 1, 4, 5, 6) whose central part receives the pivot pin 3 adapted to be moved in a vertical direction and provided with a head 3' which may be engaged in recesses 2' of the element 2. In the interior of the sole bars and on the transverse axis are located two stretchers adapted for the stowing of the trailer on the wagon. Each stretcher comprises (Figs. 1, 2, 7, 8) a stirrup member 4 pivoted on the axle 5 carried by the horizontal axle 6, which is in turn rotatably mounted in the longitudinal beam of the frame 1. In said stirrup member 4 is adapted to slide a bearing member 7 engaged by a screw 8 which is adjustable in the member 4. Due to the presence of the two axles 5 and 6, which are situated at right angles, the stretcher may be withdrawn in a horizontal position (Fig. 1) against the longitudinal beam, or it may be disposed vertically (Figs. 7 and 8).

At the exterior of the sole bars and near each end are mounted supports 89 (Fig. 1) adapted to hold four stretchers similar to those above described and mounted on the wagon. Under the sole bars and between the sets of wheels are secured four guiding members, each comprising a vertical roller 9 (Figs. 1, 3, 12), serving to effect the coincidence between the transverse axis of the trailer and that of the wagon when loading. The plungers 10 supporting the said rollers 9 rest (Fig. 12) upon an elastic device, for instance upon a set of concave spring washers 11 located in the bottom of a guide 12.

Apertures 13 are further provided at the exterior of the sole bars and symmetrically with reference to the transverse axis; said apertures 13 are adapted to receive and to hold the bars of a tractor during the loading or the unloading of the trailer.

The frame comprises two sets of two pairs of wheels, whose details are shown in Figures 11 to 15. Each of these sets consists of a rectangular frame comprising two U iron bars 16 (Figs. 3, 11, 12, 13) connected at the ends by two members 17 (Figs. 1, 2), made for instance of cast steel. These members 17 are machined in their central part to form spherical caps 18 (Figs. 2, 11, 12), in which are rotatable, preferably on ball bearings 19, the members 20. Each of these members 20 serves to support two wheels 21, which are freely mounted on balls on a common axle 22. End plates 23 (Figs. 11, 12) maintain the members 20 applied against the members 17 when the set of wheels is raised. The members 20 are provided with cranks 26 connected by pin and slot with nuts 25 engaging a threaded bar 24 (Figs. 1 to 3 and 11 to 13), in such manner that on rotation of said threaded bar, the members 20 are allowed to make a rotation of 90° in the horizontal plane. A bar 27 (Figs. 1, 2, 12, 13) serves as a guide for the nuts 25. The set of bars 24 and 27 is maintained by supports 28 connected with the frame 16—17 of the set of wheels, and consequently the frame 16—17, the bars 24 and 27 and the set of wheels 20—21 form a unit which may be raised or lowered with relation to the frame 1, as will now be explained.

The supports 28 have a recess for a removable hand-wheel which serves for the rotation of the bar 24. These supports 28 also serve as attaching points for the springs 29 as well as the supports 30 (Figs. 11 and 12) which are symmetrically located. The springs 29 connect the sets of wheels with the frame 1 in the following manner. Said springs 29 are secured in their middle portion on a threaded rod 31 which may be given an axial vertical movement. This rod 31 is screwed for instance in a tapped sleeve 33 (Figs. 14–15) adapted to rotate without sliding in a guiding recess 34 provided in a member 35 secured and maintained on the frame 1 by a plate 36 (Fig. 15). By this arrangement, when the sleeve 33 is rotated, the screw 31 is raised or lowered with relation to the frame 1 and raises or lowers the springs 29, the supports 28 and 30 together with the frame 16—17 and the set of wheels 20—21. Said sleeve 33 carries a worm-wheel 37 meshing with a worm 38. The two worms 38 of a set of wheels are carried on a common shaft 39 carried by the frame 1 and provided with a square end 40 (Figs. 1, 12, 14, 15) adapted to receive a hand wheel, by which the whole set of wheels may be displaced with relation to the frame 1.

Each set of wheels is guided in this movement, on the one hand by the beams 41 (Figs. 1 to 3 and 11, 12) of the frame, and on the other hand by the vertical faces of the guides 9 (Fig. 12) and of the brackets 42 (Fig. 11) which are symmetrical with the guides 9 with reference to the axis of the sets of wheels.

The possible vertical movement of the sets of wheels with reference to the frame 1 is for instance 200 mm. The two sets of wheels are symmetrical with reference to the transverse axis of the frame, and the threads of the bars 24 are so arranged that the rotation of the wheels with reference to the vertical axes of the members 20 will take place in the same direction.

On the frame 1 is supported a body whose length and width correspond to those of the frame; the height of the body corresponds to the standard clearance gauge required for railways, when said trailer is on its wagon. The body has at each end an opening provided with metallic curtains 43 (Figs. 1, 2), which can be kept closed from the interior or the exterior by locks 44 (Fig. 2). These openings further comprise two lateral panels 45—46 (Fig. 3) which are mounted on vertical hinges and can be turned at the exterior in the position 45'—46' shown in Fig. 1. At the upper end of the panel 45 is hingedly connected a sheet metal piece 49 which can be applied along the panel 45 (Fig. 2), and which, when raised at 90°, may assume the position 49' (Fig. 1) and form a roof resting upon the panels 45—46. The lower part 55 (Fig. 2) of each metallic curtain 43 may fit upon the sheet metal pieces 49 when these are raised to form a roof.

At each end of the floor of the body are hingedly mounted at 51 sheet metal pieces 50 provided with brackets 52 which are also hinged to said pieces 50. Said pieces 50 may assume a vertical position, but when they are lowered outwardly, they form an extension of the floor. Locks 54 (Fig. 9) slidable in guides 88 serve to maintain the brackets 52 against the pieces 50 when these latter are in the vertical position.

When the panels 45—46 and sheet metal pieces 50—49 have been turned in their outward position and when the curtains 43 are lowered upon the roof part 49', a passage is thus formed.

The interior arrangement of the body is variable and may be suitable to the class of transportation which is to be effected. In particular, the side walls and roof may be provided with glass windows or clear-stories, or with curtains and orifices for ventilation. The body may also be arranged on the isothermal system or may be provided with steam heating by means of coupling pieces mounted on the piping of the wagon. The interior is lighted electrically by the use of plugs 56 (Fig. 2) and 57 (Figs. 1, 3, 5, 6), which may be connected with the circuit of the wagon.

It is to be noted that the trailer is reversible as regards the direction of travel and may be coupled at either of its ends.

The wagon (Figs. 16 to 21), preferably of the bogie type, has a frame consisting of two main beams 58 downwardly curved at two places 59 which are separated by a distance equal to the distance between the sets of trailer wheels. The highest part of these beams is located at 115 centimeters above the upper level of the rail, whilst the upper surfaces of the curved portions 59 are at 300 mm. above the same level of the rail. These beams 58 are connected together by:

1. A frame 60 (Figs. 16–17), in which the vertical surfaces 61 of the transverse parts serve as a roller path for the rollers 9 of the guides of the trailer during the loading; said frame comprises two rounded parts 62 (Fig. 17) allowing a longitudinal displacement of said rollers and hence of the trailer, when said trailer is loaded on the wagon.

2. Two cross-pieces 63 of cast steel, whose cross section, in the form of a trough, serves as a roller path for the wheels of the trailer, and whose lower part serves as a support for the rod-and-link gear 64 of the brake (Fig. 16) and for the conduits for air 65 and for steam 66, and the electric conductors 67 (Fig. 18).

3. Two cross pieces 68 of cast steel, whose central part is made hollow at 69 in order to receive the load bearing elements 2 and the pivot pins 3 of the trailer (Figs. 1, 4, 5, 6).

4. Two cross pieces of cast steel 70 resting upon the bogies and the bolsters; these cross pieces 70 are extended at 71 (Figs. 17–18) beyond the beams 58 in order to support the iron pieces 72 serving as sole bars.

The cross pieces 63 are extended by hingedly mounted end parts 73 (Figs. 16 to 21), which can be raised. These end parts 73, whose form serves to facilitate the entrance of the wheels of the trailer, are supported on the one hand by their insertion into the members 74 (Figs. 18 to 21) secured on the downwardly curved portions 59 of the beams 58, and on the other hand by truss-rods 75 provided with hooks 76 (Fig. 20) held in apertured pieces secured to the beams 58. These truss-rods 75 are elastic due to the presence of springs 77 disposed in boxes 78.

The left hand part of Fig. 18 indicates the raised position of the end parts 73 when the trailer is loaded, and the right hand part the position when lowered for the loading.

The frame 60 carries supports 79 which receive the stretchers 4 of the trailer. The beams 72 carry, on the other hand, the stretchers 80 (Figs. 16-17) which are secured to the supports 89 of the trailer and are applied in their idle position, upon supports 81 mounted in the hollow part of the beams 72.

At each end of the wagon frame is mounted a body 83 whose cross section is analogous to that of the trailer. The bodies 83 are closed at the ends next the draw gear by a door provided with bellows 84 permitting the intercommunication between the wagons. At the other end, they are closed by metallic curtains 85 resembling those of the trailers. They may be also provided with doors opening on to the track. They are electrically lighted by the current supplied by a generator of the locomotive, and a loose cable 86 (Fig. 16) permits of connecting their circuit with the plugs 56 of the trailers. Like the trailers, they may be provided with glazed windows and with clear-stories.

In order to load the trailer upon the wagon, the trailer is brought in a position in which the sets of wheels will be opposite the cross pieces 63 of the wagon. The pins 3 of the trailer are raised and the wheels 21 are turned through 90° by acting upon the bars 24 of the trailer. The trailer is then pushed on to the wagon until the wheels make contact with the end parts 73 of the wagon which have been previously raised on the side opposite the entrance (Fig. 18). In this movement, the guiding rollers 9 bear against the transverse surfaces 61 of the frame 60, and the convergent edges of the end parts 73 aid in giving the trailer a suitable position. The end parts 73 on the side next the entrance are raised while engaging the hooks 76 of the truss-rods 75 in the corresponding apertures of the wagon.

The trailer is then lowered by acting on the worms 38 (Figs. 14-15) until the frame 1 rests on the wagon. In this movement, the bearings 2 engage in corresponding recesses 69 of the crosspieces 68, owing to their inclined sides. The pins 3 are inserted in the holes provided in the bottom of said recesses 69 and they are turned through 90° so as to engage their heads 3' in the recess 2' of the bearings 2. The stretchers 4 of the trailer and the stretchers 80 of the wagon are placed upon their respective supports 79 and 89 and are tightened. The trailer is connected with the bodies 83 of the wagon, while lowering the pieces 50 and opening out the panels 45—46 and the roof 49. The loose cable 86 is connected with the plug 56 of the trailer.

For the unloading, the reverse operation is performed.

Having now described my invention what I claim as new and desire to secure by Letters Patent is:

1. A vehicle for transportation by rail and by road comprising in combination a wagon adapted to travel on rail and provided with longitudinal beams, each having upper portions and two downwardly curved portions, two transversal cross members on said wagon carried on said downwardly curved portions, and a removable part comprising a frame, four supports carried by said frame at the corners of a rectangle and rotatably mounted on said frame about vertical axes, a wheel structure carried by each support and rotatably mounted on said support about a horizontal axis, means for rotating said supports, said means being adapted to maintain said supports in two different positions, in which the wheels have their plane in two directions at right angles, one of said directions being parallel to the longitudinal axis of said frame, whereby the removable part is adapted to travel on road, and the other direction being perpendicular to said longitudinal axis, whereby the wheels are adapted to be guided on said transversal cross members on said wagon.

2. A vehicle for transportation by rail and by road comprising in combination a wagon adapted to travel on rail and provided with longitudinal beams each having upper portions and two downwardly curved portions, two transversal cross members on said wagon carried on said downwardly curved portions, at each end of each transversal cross member a hingedly mounted piece adapted to assume a lower position in which said piece forms an outward extension of said cross member and an upper position in which said piece forms a stop piece, means for maintaining said pieces in their upper and in their lower position, and a removable part comprising a frame, four supports carried by said frame at the corners of a rectangle and rotatably mounted on said frame about vertical axes, a wheel structure carried by each support and rotatably mounted on said support about a horizontal axis, means for rotating said supports, said means being adapted to maintain said supports in two different positions, in which the wheels have their plane in two directions at right angles, one of said directions being parallel to the longitudinal axis of said frame, whereby the removable part is adapted to travel on road, and the other direction being perpendicular to said longitudinal axis, whereby the wheels are adapted to be guided on said transversal cross members on said wagon and on said hingedly mounted pieces when in their lower position and to be stopped by said pieces when in their upper position.

3. A vehicle for transportation by rail and by road according to claim 1 comprising the further feature consisting in transversal beams secured on the upper portions of said longitudinal beams, and rollers carried by the frame of said removable part and adapted to cooperate with said transversal beams and to guide said removable part in a transversal direction on said wagon.

4. A vehicle for transportation by rail and by road comprising in combination a wagon adapted to travel on rail and provided with longitudinal beams each having upper portions and two downwardly curved portions, two transversal cross members on said wagon carried on said downwardly curved portions, load sustaining members carried by the upper portions of said longitudinal beams, and a removable part comprising a frame, four supports carried by said frame at the corners of a rectangle and slidingly and rotatably mounted on said frame about vertical axes, a wheel structure carried by each support and rotatably mounted on said support about a horizontal axis, means for rotating said support, said means being adapted to maintain said supports in two different positions, in which the wheels have their plane in two directions at right angles, one of said directions being parallel to the longitudinal axis of the frame, whereby the removable part is adapted to travel on road, and the other direction being perpendicular to said longitudinal axis, whereby the wheels are adapted to be guided on said transversal cross members on said wagon, means for moving said supports in a vertical direction upwards and downwards, and bearing members carried by said removable part and adapted to cooperate with said sustaining members of the wagon when said supports are moved downwards.

5. A vehicle for transportation by rail and by road according to claim 4 comprising the further feature consisting in removable connecting means between said sustaining members and said bearing members.

6. A vehicle for transportation by rail and by road comprising in combination a wagon adapted to travel on rail, two transversal cross members on said wagon, and a removable part comprising a frame, two carriers supported on said frame and disposed in a transversal direction, guiding means adapted to guide said carriers in a vertical direction, two transversal shafts carried on said frame, two worms on each of said shafts near the ends of said shafts, four inwardly threaded sleeves rotatably mounted in said frame near the ends of said carriers, a worm wheel secured on each of said sleeves and adapted to mesh with a corresponding worm, screws connected with said carriers and adapted to be engaged in said inwardly threaded sleeves, whereby the carriers are adapted to be moved upwards and downwards when said shafts are rotated, on each carrier two supports rotatably mounted on said carrier about vertical axes, a wheel structure carried by each support and rotatably mounted on said support about a horizontal axis, a threaded transversal rod carried by each carrier and adapted to be rotated, on each threaded rod two nuts adapted to slide along said rod when said rod is rotated, and a sliding connection between each of said nuts and a corresponding support, whereby said supports may be brought and maintained into two different positions, in which the wheels have their plane in two directions at right angles, one of said directions being parallel to the longitudinal axis of said frame, whereby the removable part is adapted to travel on road, and the other direction being perpendicular to said longitudinal axis, whereby the wheels are adapted to be guided on said transversal cross members on said wagon.

7. A vehicle for transportation by rail and by road comprising in combination a wagon adapted to travel on rail, two transversal cross members on said wagon, and a removable part comprising a frame, four supports carried by said frame at the corners of a rectangle and rotatably mounted on said frame about vertical axes, a wheel structure carried by each support and rotatably mounted on said support about a horizontal axis, means for rotating said supports, said means being adapted to maintain said supports in two different positions, in which the wheels have their place in two directions at right angles, one of said directions being parallel to the longitudinal axis of said frame, whereby the removable part is adapted to travel on road, and the other direction being perpendicular to said longitudinal axis, whereby the wheels are adapted to be guided on said transversal cross members on said wagon, a body carried on said frame of said removable part, two bodies carried on said wagon at each end of said wagon, and folding communicating passages between said bodies and carried by said bodies.

JULIEN RENÉ LOUIS DEGLARGE.